US007739007B2

(12) United States Patent
Logsdon

(10) Patent No.: US 7,739,007 B2
(45) Date of Patent: Jun. 15, 2010

(54) VEHICLE DIAGNOSTIC METHOD AND SYSTEM WITH INTELLIGENT DATA COLLECTION

(75) Inventor: Matthew Gabriel Logsdon, Cary, IL (US)

(73) Assignee: Snap-On Incorporated, Kenosha, WI (US)

( * ) Notice: Subject to any disclaimer, the term of this patent is extended or adjusted under 35 U.S.C. 154(b) by 127 days.

(21) Appl. No.: 11/394,038

(22) Filed: Mar. 29, 2006

(65) Prior Publication Data

US 2007/0233341 A1 Oct. 4, 2007

(51) Int. Cl.
*G06F 19/00* (2006.01)
*G01M 17/00* (2006.01)

(52) U.S. Cl. ........................................................ 701/33

(58) Field of Classification Search ....................... None
See application file for complete search history.

(56) References Cited

U.S. PATENT DOCUMENTS 4,404,639 A * 9/1983 McGuire et al. .............. 701/35
5,111,402 A * 5/1992 Brooks et al. ................. 701/35
5,442,553 A 8/1995 Parrillo
5,592,614 A * 1/1997 Peters ........................ 714/26
5,798,647 A * 8/1998 Martin et al. ............... 324/503
5,961,561 A * 10/1999 Wakefield, II ................ 701/29
6,134,488 A * 10/2000 Sasaki et al. .................. 701/31
6,141,608 A * 10/2000 Rother ........................ 701/33
6,263,265 B1 * 7/2001 Fera ........................... 701/19
6,285,932 B1 * 9/2001 de Bellefeuille et al. ....... 701/33
6,308,120 B1 * 10/2001 Good .......................... 701/29
6,330,499 B1 * 12/2001 Chou et al. .................... 701/33
6,366,199 B1 * 4/2002 Osborn et al. ............... 340/438
6,370,454 B1 * 4/2002 Moore ......................... 701/29
6,370,455 B1 * 4/2002 Larson et al. ................. 701/33
6,512,968 B1 * 1/2003 de Bellefeuille et al. ...... 701/33
6,542,799 B2 * 4/2003 Mizutani et al. .............. 701/33
6,553,292 B2 * 4/2003 Kokes et al. .................. 701/33
6,611,740 B2 * 8/2003 Lowrey et al. ................ 701/29
6,615,120 B1 * 9/2003 Rother ........................ 701/33
6,640,166 B2 * 10/2003 Liebl et al. .................... 701/29
6,714,846 B2 * 3/2004 Trsar et al. .................... 701/33
6,766,229 B2 * 7/2004 Dry et al. ...................... 701/29
6,782,313 B1 * 8/2004 Frech et al. ................... 701/31
6,836,539 B2 * 12/2004 Katou et al. ........... 379/106.01
6,845,307 B2 * 1/2005 Rother ........................ 701/33

(Continued)

FOREIGN PATENT DOCUMENTS

FR 2865994 8/2005

(Continued)

OTHER PUBLICATIONS

Search Report.

*Primary Examiner*—Mark Hellner
*Assistant Examiner*—Ari M Diacou
(74) *Attorney, Agent, or Firm*—McDermott Will & Emery LLP

(57) ABSTRACT

Vehicle diagnostic devices and methods that detect the occurrence of a maintenance process performed on a vehicle, and responsive to the detected occurrence of the maintenance process, initiate a data collection process to collect data related to the performed maintenance process, and a data transmission process to provide the collected data to a remote data depository.

15 Claims, 3 Drawing Sheets

U.S. PATENT DOCUMENTS

| | | | | |
|---|---|---|---|---|
| 6,879,894 | B1 * | 4/2005 | Lightner et al. | 701/33 |
| 6,925,368 | B2 * | 8/2005 | Funkhouser et al. | 701/33 |
| 6,927,682 | B1 | 8/2005 | Touhey et al. | |
| 6,959,235 | B1 * | 10/2005 | Abdel-Malek et al. | 701/33 |
| 6,993,421 | B2 * | 1/2006 | Pillar et al. | 701/33 |
| 7,130,769 | B1 * | 10/2006 | Allen et al. | 702/184 |
| 7,171,929 | B2 * | 2/2007 | Dosdall et al. | 123/90.15 |
| 7,191,040 | B2 * | 3/2007 | Pajakowski et al. | 701/1 |
| 7,209,815 | B2 * | 4/2007 | Grier et al. | 701/29 |
| 7,209,860 | B2 * | 4/2007 | Trsar et al. | 702/183 |
| 2002/0007237 | A1 * | 1/2002 | Phung et al. | 701/33 |
| 2002/0016655 | A1 * | 2/2002 | Joao | 701/35 |
| 2002/0103582 | A1 * | 8/2002 | Ohmura et al. | 701/33 |
| 2002/0103583 | A1 * | 8/2002 | Ohmura et al. | 701/33 |
| 2002/0111727 | A1 * | 8/2002 | Vanstory et al. | 701/33 |
| 2002/0133273 | A1 * | 9/2002 | Lowrey et al. | 701/29 |
| 2002/0138185 | A1 * | 9/2002 | Trsar et al. | 701/33 |
| 2002/0193925 | A1 * | 12/2002 | Funkhouser et al. | 701/33 |
| 2003/0036832 | A1 * | 2/2003 | Kokes et al. | 701/33 |
| 2003/0083794 | A1 | 5/2003 | Halm et al. | |
| 2004/0016804 | A1 * | 1/2004 | Namaky et al. | 235/435 |
| 2004/0044452 | A1 * | 3/2004 | Bauer et al. | 701/33 |
| 2004/0210360 | A1 | 10/2004 | Dietz et al. | |
| 2004/0210362 | A1 * | 10/2004 | Larson et al. | 701/29 |
| 2004/0215379 | A1 * | 10/2004 | Pangerl et al. | 701/33 |
| 2005/0021294 | A1 | 1/2005 | Trsar et al. | |
| 2005/0043868 | A1 * | 2/2005 | Mitcham | 701/29 |
| 2005/0137762 | A1 * | 6/2005 | Rother | 701/29 |
| 2005/0171661 | A1 * | 8/2005 | Abdel-Malek et al. | 701/33 |
| 2006/0052918 | A1 * | 3/2006 | McLeod et al. | 701/29 |
| 2006/0136104 | A1 * | 6/2006 | Brozovich et al. | 701/29 |
| 2006/0142908 | A1 * | 6/2006 | Grier et al. | 701/29 |
| 2006/0142909 | A1 * | 6/2006 | Grier et al. | 701/29 |
| 2007/0073460 | A1 * | 3/2007 | Bertosa et al. | 701/29 |
| 2007/0233341 | A1 * | 10/2007 | Logsdon | 701/29 |
| 2008/0140281 | A1 * | 6/2008 | Morris et al. | 701/33 |

FOREIGN PATENT DOCUMENTS

| | | |
|---|---|---|
| WO | WO 96/27171 | 9/1996 |
| WO | WO 01/71306 | 9/2001 |

* cited by examiner

VEHICLE DIAGNOSTIC METHOD AND SYSTEM WITH INTELLIGENT DATA COLLECTION

FIELD OF DISCLOSURE

The present disclosure relates to vehicle diagnostic methods and systems with intelligent data collection, and more specifically, to detecting an occurrence or completion of a maintenance process and responsively collecting and transmitting data related to the maintenance process.

BACKGROUND OF THE DISCLOSURE

The automotive diagnostic industry has been using data mining techniques to develop expert suggestions and identify effective fixes for vehicle problems. Data related to maintenance activities is collected from garages located all over the country. A group of human experts or expert computer systems then review and analyze the collected data for the purpose of identifying and validating effective fixes, and generating expert suggestions. The effective fixes and expert suggestions are then implemented in diagnostic software or incorporated in user's manuals to assist technicians in performing diagnoses on vehicles.

The process of collecting diagnostic data is often tedious and requires a lot of human work and intervention. Some garages require technicians to write down steps and services that they perform on each vehicle. A clerk then reviews, compiles and enter the data into a computer system for transmission to a remote data depository such that data mining can be performed. However, not all garages have the resources or capacity needed to collect and transmit diagnostic data. Some garages do not have enough manpower to compile and enter the diagnostic data, while others do not have the hardware or equipment to transmit the data. As a result, a lot of valuable data is unavailable for analysis due to difficulties in collecting or transmitting diagnostic data.

Therefore, there is a need to automate the process of collecting diagnostic data. There is another need to identify the occurrence or completion of a maintenance process and collect the diagnostic data. There is a further need to timely transmit the diagnostic data to a data depository.

SUMMARY OF THE DISCLOSURE

This disclosure describes various vehicle diagnostic devices and methods that detect the occurrence or completion of a maintenance process performed on a vehicle, and responsive to the detected occurrence or completion of the maintenance process, initiate a data collection process to collect data related to the performed maintenance process. The collected data may be transmitted to a remote data depository for further processing.

In one embodiment, responsive to the detected occurrence or completion of the maintenance process, a data solicitation process is performed to solicit a user to input data related to the maintenance process. The maintenance process may be performed in connection with a specific symptom. The collected data includes at least one of an effective fix of the symptom and a description of the symptom. A screen may be provided to display a message requesting input of the data related to the maintenance process.

In another embodiment, the occurrence or completion of the maintenance process is determined based on the existence of a command to clear an error code, a change of a serial number associated with a controller on the vehicle, or a removal of an error code from an error code record. In another embodiment, the diagnostic device is implemented as an integral part of the vehicle.

Additional advantages and novel features of the present disclosure will be set forth in part in the description which follows, and in part will become apparent to those skilled in the art upon examination of the following, or may be learned by practice of the present disclosure. The drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the accompanying drawings, wherein elements having the same reference numeral designations represent like elements throughout and wherein.

DETAILED DESCRIPTIONS OF ILLUSTRATIVE EMBODIMENTS

In the following description, for the purposes of explanation, numerous specific details are set forth in order to provide a thorough understanding of the present disclosure. It will be apparent, however, to one skilled in the art that concepts of the disclosure may be practiced or implemented without these specific details. In other instances, well-known structures and devices are shown in block diagram form in order to avoid unnecessarily obscuring the present disclosure.

System Architecture

Figure 1:
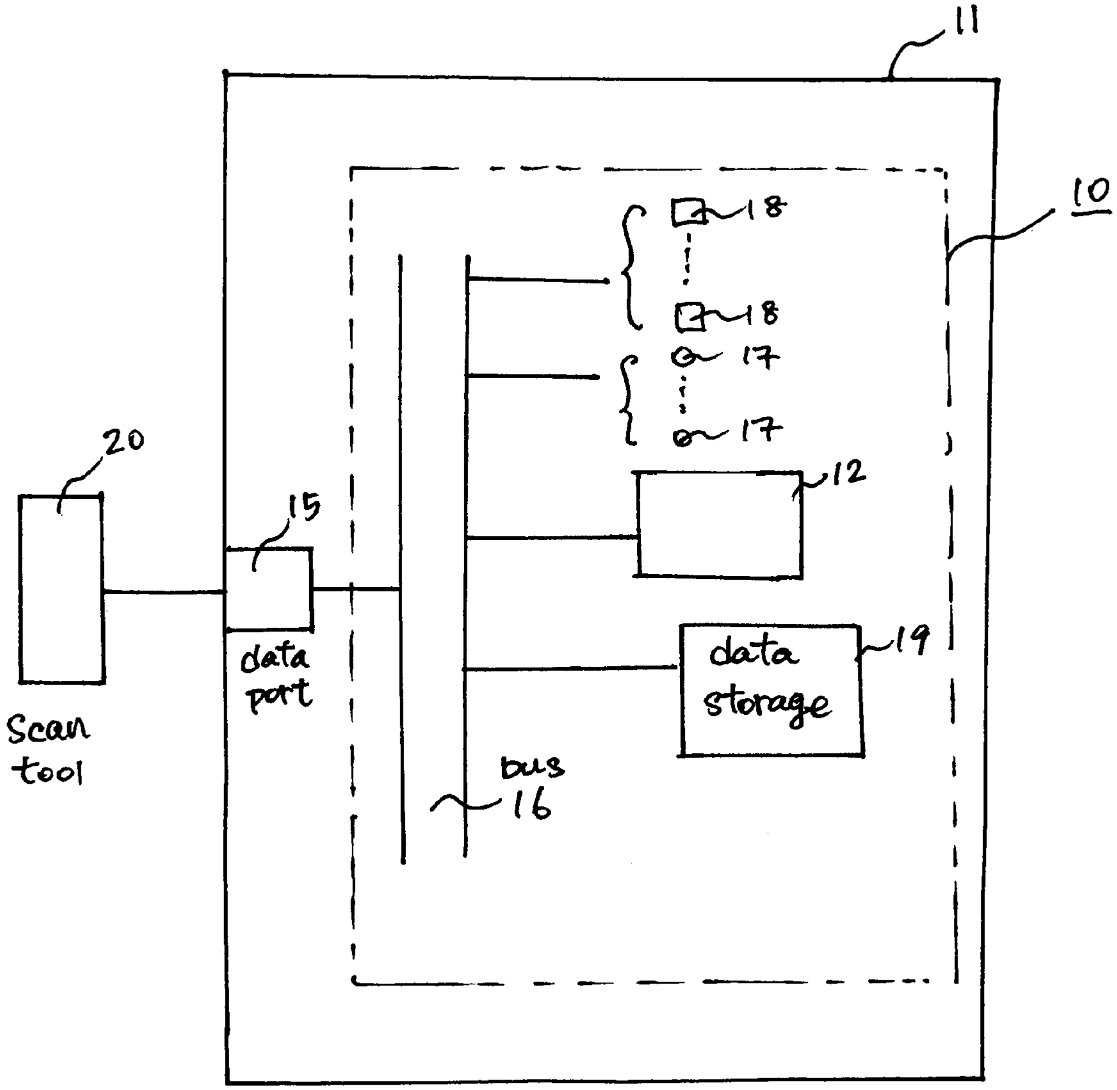
FIG. 1 is a block diagram of an exemplary diagnostic system.

FIG. 1 shows an exemplary diagnostic system 10 for use with a vehicle 11. Sensors 17 and electronic control units (ECUs) 18 are disposed at various portions of vehicle 11 to control the operations, and collect operation data, of various subsystems or parts of the vehicle, such as engine, transmission, tires, electronic system, AC, oil level, emission, etc. Diagnostic system 10 further includes a data processor 12 and a data storage device 19 for storing data. Examples of data storage device 19 include floppy disks, hard disk drives, magnetic tapes, optical disks, such as CD-ROM, DVD, semiconductor storage devices, such as RAM, PROM, and EPROM, FLASH-EPROM, memory chips or cartridges, etc., or any combination(s) thereof. Data processor 12, data storage device 19, sensors 17 and ECUs 18 are coupled to a diagnostic bus 6. Data processor 12 performs diagnoses on various subsystems of vehicle 11 based on information provided by ECUs 18 and sensors 17, and records error codes in data storage device 19. In one embodiment, diagnostic system 10 includes dashboard displays and/or user interface for informing the driver of various operating conditions and/or receiving input from the driver. In another embodiment, diagnostic system 10 includes a data communication device for establishing data links with a remote data processing system and/or a data network. For example, the data communication device can be an internet link, a wireless transceiver, a Bluetooth interface, etc. Data or information generated by diagnostic system 10 may be sent to a remote data processing system via the data communication device.

A data port 15 is provided for coupling to external devices, such as a scan tool 20. Examples of data port 15 include OBD II interface, USB connectors, wireless transceivers, or any type of data outlet for transmitting data. Scan tools are widely used in the automotive diagnostic industry for communicating with, or downloading data from, on-board computers. Examples of scan tools include SOLUS™ Scanner made by Snap-on Inc. Scan tool 20 may further couple to another data processing system or a data network, such as the internet, so that data generated by diagnostic system 10 or scan tool 20 can be transmitted to, or accessed by, other data processing systems.

System Operation

In operation, sensors 17 and ECUs 18 constantly collect and deliver operation information related to various subsystems of vehicle 11 to data processor 12. In one embodiment, ECUs 18 generate and store error codes indicating errors encountered by ECUs 18 and/or their associated subsystems. The operation information and/or error codes are sent to data processor 12 and stored in data storage device 19. During a diagnostic process, scan tool 20 is connected to OBD II port 15 to download error codes stored in diagnostic system 10. Based on the downloaded error codes, a technician determines what symptoms or problems are encountered by vehicle 11, and what types of errors occurred in which subsystems of vehicle 11. Appropriate analysis and repair can then be performed to pinpoint trouble spots and cure the problem. If needed, old ECUs 18 or parts are replaced by new ECUs or parts.

Figure 2:
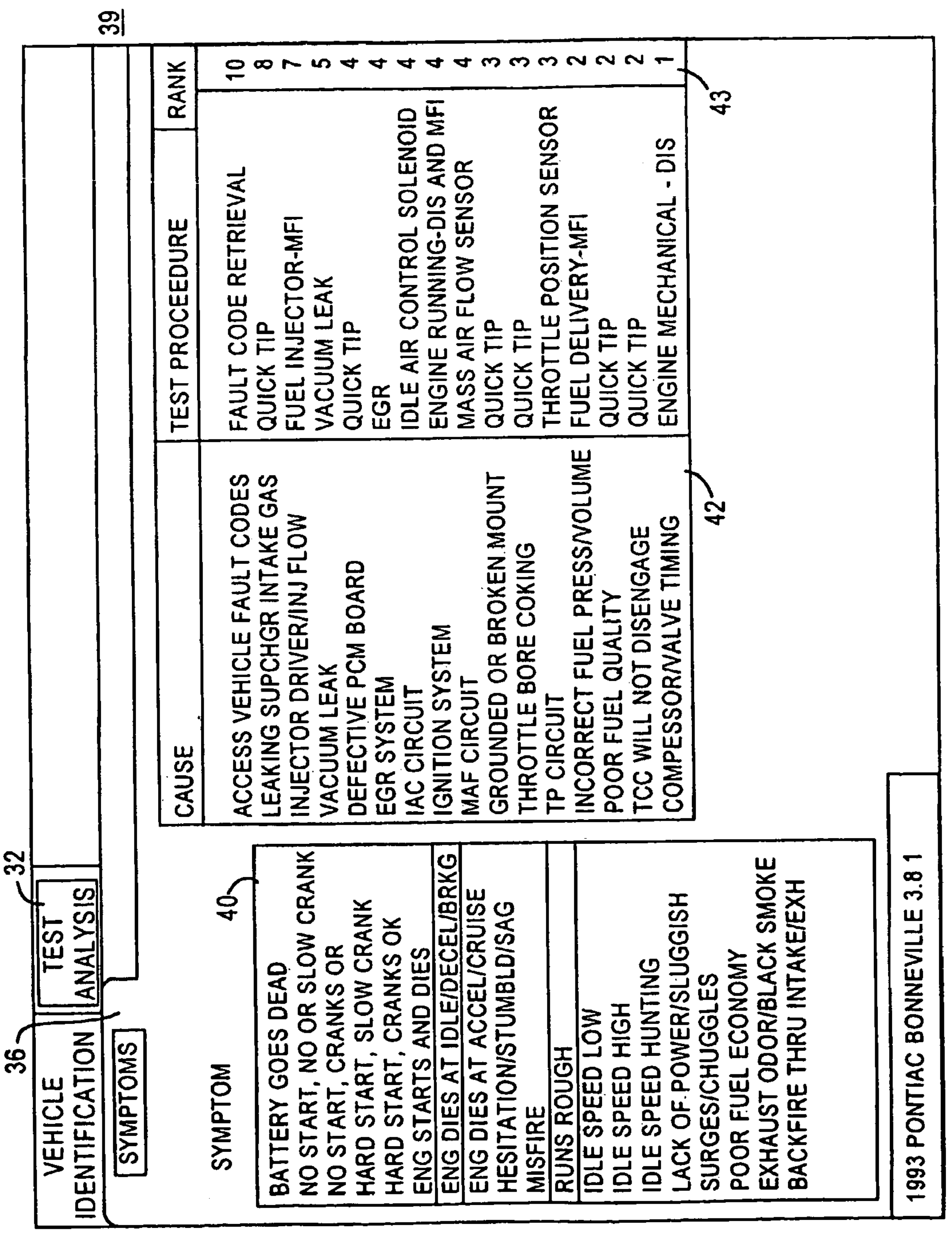
FIG. 2 shows an exemplary user interface providing suggestions of test procedures.

Some scan tools integrate diagnostics, tests and scanner functions on a single device. FIG. 2 shows an exemplary user interface 30 of scan tool 20. User interface 30 includes icons respectively designated as "Vehicle Identification" and "Test/Analysis." When the Vehicle Identification icon is selected, scan tool presents the user with a number of questions or fields, such as model year, make, model name, engine size and the like, each field presenting the user with a menu of unique values from within that field from which the user may select to identify the vehicle under diagnosis.

Once the vehicle is identified, the user is able to begin diagnosis by selecting the Test/Analysis icon 32, scan tool 20 brings up a screen display 39 as shown in FIG. 2. A list of symptoms 40 related to vehicle 11 is displayed.

When a user selects one or more of the listed symptoms that are exhibited by the vehicle under test, the screen display 39 presents a list 42 of possible causes of the symptom or symptoms selected and an associate list of test procedures to be performed to check for those causes. The test procedures are listed in the order of the probability or likelihood that the test will be successful in diagnosing the cause of the selected symptom or symptoms. In one embodiment, scan tool 20 presents a list of suggested fixes for each symptoms such that the user may proceed to repair the vehicle directly.

Detection Of Occurrence Of Maintenance Process

Diagnostic system 10 has the capacity to determine when a maintenance process or repair work has been performed or completed on vehicle 11, and responsively transmits data related to the maintenance process to a remote data server for data mining purpose.

In one embodiment, after the technician finishes a maintenance job to repair certain subsystems of vehicle 11, the technician is required to issue an erase command or a clear code via scan tool 20 to clear the error codes stored in diagnostic system 10. The format of the erase command or clear code may be in the format of:

ID of erase command + ID of error code to be erased

For instance, according to the SAE (Society of Automotive Engineers) Recommended Practices, a technician is required to issue a DM3 command or PID 195 command to erase error codes stored in diagnostic system 10. In response to the erase command or clear code, the error code associated with the fixed problem is removed or erased from the data storage device 19 and/or associated ECUs 18. Diagnostic system 10 constantly monitors commands sent from scan tool 20. According to the receipt of an erase command or clear code, diagnostic system 10 determines that a maintenance process has occurred or completed. Based on the content of the erase command, the error code to be erased by the erase command can be determined. According to another embodiment, the occurrence or completion of a maintenance process is determined based on a change of an error code list maintained in diagnostic system 10. As discussed earlier, diagnostic system 10 stores a list of all error codes representing all errors encountered by the subsystems of vehicle 11. Whenever a problem is fixed, the technician is required to issue an erase command or clear code to remove the corresponding error code stored in ECUs and/or the list of error codes maintained by diagnostic system 10. Thus, the removal of an error code indicates that a maintenance process has been performed on vehicle 11 to repair certain problems.

According to still another embodiment, diagnostic system 10 keeps track of serial numbers of ECUs 18 and/or parts installed in vehicle 11. Each ECU reads serial numbers of the parts in its associated subsystem, and communicates with data processor 12 to convey the serial numbers. A list of serial numbers of ECUs 18 and/or the parts of vehicle 11 is maintained in data storage device 19. Whenever a new ECU or part is installed, the list of serial numbers is updated accordingly. Diagnostic system 10 detects the occurrence or completion of a maintenance process based on the existence of a new part installed in vehicle 11. If the technician replaces an old part with a new part to fix a problem, the serial number of the new part is reported to data processor 12. Based on the receipt of the information related to the new part, diagnostic system 10 determines that a maintenance process has occurred.

Solicitation Of Data Input And Data Transmission

In response to the determination that a maintenance process has been performed on vehicle 11, diagnostic system 10 generates a message to solicit data input from the technician regarding the tasks performed on the vehicle. In one embodiment, the message is displayed on a dashboard display. According to another embodiment, diagnostic system 10 sends a command to scan tool 20 to display a message on scan tool 20 to solicit data input from the technician regarding the tasks performed on the vehicle.

The technician enters his or her input via the user interface of diagnostic system 10, such as a dashboard display and input buttons of the vehicle, or via the user interface of scan tool 20. In one embodiment, the data to be input by the technician includes vehicle information, symptoms and/or problems encountered by vehicle 11, identification of failed subsystems or parts, tests performed during the diagnoses, etc.

In another embodiment, in addition to the information entered by the technician, diagnostic system 10 also collects and compiles additional data related to the maintenance process. The additional data may be any data that is stored in diagnostic system 10 and/or scan tool 20, and associated with the failed parts, the performed tests and diagnoses, attributes of the vehicles (year, make, model, engine particulars, etc.), operation history of the vehicle, symptoms or faults, effective tests for finding causes of a specific symptom, effective fixes corresponding to a specific fault, measurements obtained during the diagnoses, information obtained from vehicle on-board computers, additional comments/descriptions entered by technicians, ineffective tests/fixes corresponding to various symptoms/faults, information related to the technician who conducted the diagnostics, etc.

Diagnostic system 10 then initiates a data transmission process to send the data collected from the technician and/or any additional data relating to the vehicle problem and the maintenance process, to a remote data depository for further processing or data mining. The transmission of the data is performed via the communication device of diagnostic system 10, via scan tool 20, or via any other communication devices coupled to diagnostic system 10. If vehicle 11 or the garage that performs the maintenance process does not have data transmission capacity, diagnostic system 10 stores the collected data and any additional data related to the maintenance process in data storage device 19, such that the data related to the maintenance process is not lost. If at a later time, vehicle 11 is brought to another maintenance facility that has the data transmission capacity, diagnostic system 10 initiates a data transmission process to transmit the stored data to the remote data depository.

In one embodiment, the above-described functions are implemented by machine-readable instructions stored in data storage device 19, and for execution by data processor 12 of diagnostic system 10.

In another embodiment, the detection of the occurrence or completion of a maintenance process, and the transmission of diagnostic data are performed by scan tool 20. As discussed earlier, after a technician finishes a maintenance job to repair certain subsystems of vehicle 11, the technician is required to issue an erase command or a clear code via scan tool 20 to diagnostic system 10 to clear the error codes stored in diagnostic system 10. Therefore, whenever an input to issue an erase command or a clear code is to be issued, scan tool 20 determines that a maintenance process has occurred. In response, scan tool 20 prompts the technician to input data related to the maintenance service. Scan tool 20 may also communicate with diagnostic system 10 to obtain data that is stored in diagnostic system 10 and related to the fault cured by the maintenance process.

Scan tool 20 then initiates a process to send the collected data and/or any additional data relating to the vehicle problem and the maintenance process to the remote data depository for further processing or data mining purpose. The additional data may be any data that is stored in scan tool 20 and/or diagnostic system 10, and associated with the failed parts, the performed tests and diagnoses, attributes of the vehicles (year, make, model, engine particulars, etc.), symptoms or faults, effective tests for finding causes of a specific symptom, effective fixes corresponding to a specific fault, measurements obtained during the diagnoses, information obtained from vehicle on-board computers, additional comments/descriptions entered by technicians, ineffective tests/fixes corresponding to various symptoms/faults, information related to the technician who conducted the diagnostics, etc.

Figure 3:
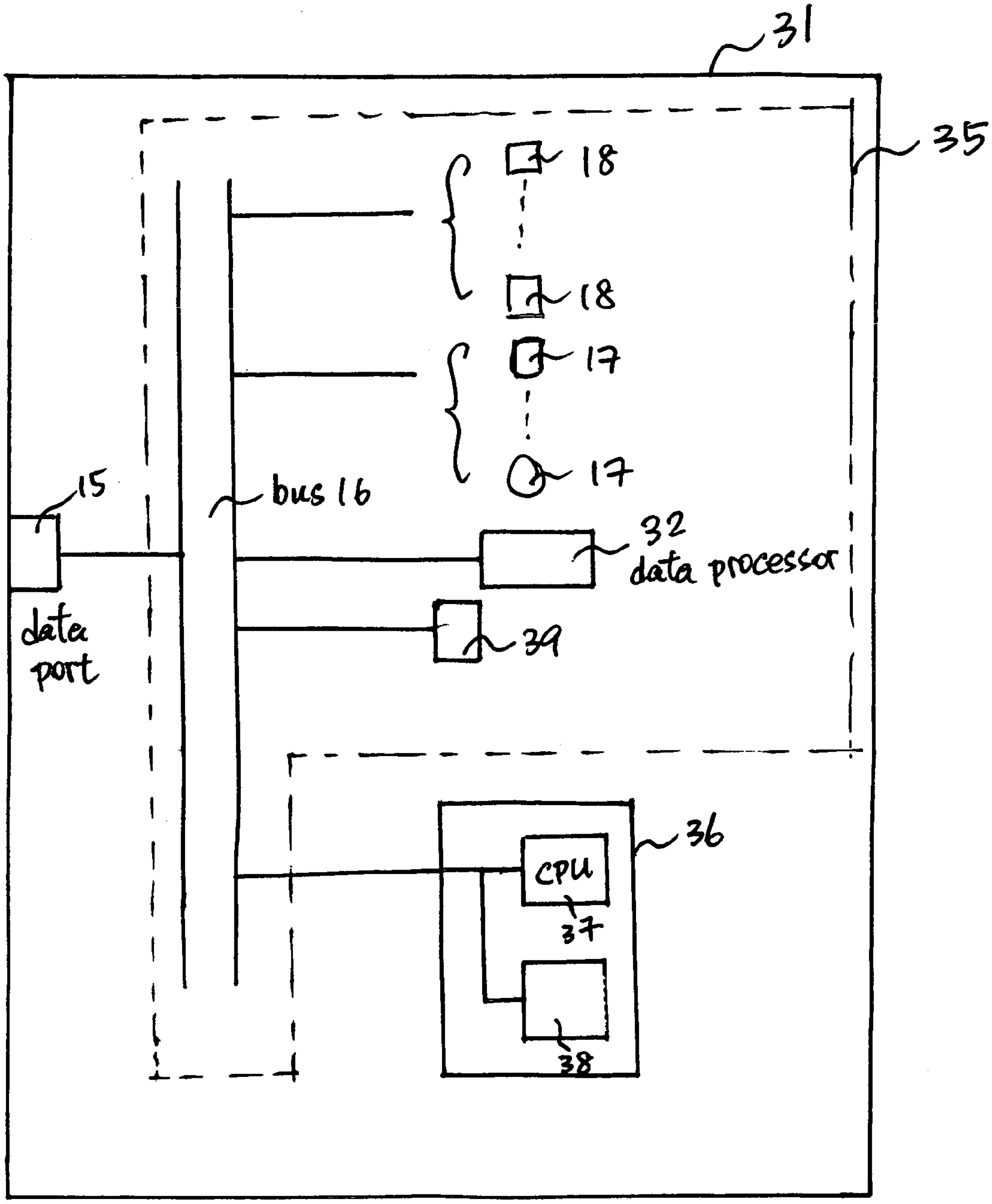
FIG. 3 depicts a block diagram of another exemplary diagnostic system for use with a vehicle.

FIG. 3 depicts a block diagram of another embodiment of a diagnostic system 30 for use with an on-board diagnostic system 35 of a vehicle 31. On-board diagnostic system 35 is substantially similar to the diagnostic system 10 shown in FIG. 1. Elements having the same reference numeral designations represent like elements throughout. Data processor 32 executes instructions stored in storage device 39 and performs diagnoses on various subsystems of vehicle 11 based on information provided by ECUs 18 and sensors 17, and records error codes in data storage device 19.

In this embodiment, diagnostic system 36 is implemented as a separate device from on-board diagnostic system 35. A data processor 36 is provided to process data and execute instructions. Diagnostic system 36 further includes a wireless communication device 38 for establishing wireless communications with a data processing system that is external to the vehicle. Diagnostic system 36 is detachably connected to on-board diagnostic system 35 via a connector which couples diagnostic system 36 to bus 16 of on-board diagnostic system 35.

CPU 37 constantly monitors the signals and traffic on bus 16. As discussed earlier, after the technician finishes a maintenance job to repair certain subsystems of vehicle 31, the technician is required to issue an erase command or a clear code via a scan tool connected to data port 15 to clear the error codes stored in on-board diagnostic system 35. The clear code is sent from the scan tool to on-board diagnostic system 35 via bus 16. According to the receipt of an erase command or clear code detected on bus 16, diagnostic system 36 determines that a maintenance process has occurred or completed. Based on the content of the erase command, the error code to be erased by the erase command can be determined.

According to another embodiment, the occurrence or completion of a maintenance process is determined based on a change of an error code list. Diagnostic system 36 constantly monitors the error codes generated by ECUs 18 or sensors 17, and maintains a list of all error codes representing all errors encountered by the subsystems of vehicle 31.

Whenever a problem is fixed, the technician is required to issue an erase command or clear code to remove the corresponding error code stored in ECUs 18 and or data storage device 39. The erase command or clear code can be detected by diagnostic system 36 by monitoring the traffic of bus 16. The list of error codes maintained by diagnostic system 36 is updated or revised accordingly. Thus, the removal of an error code indicates that a maintenance process has been performed on vehicle 31 to repair certain problems.

According to still another embodiment, diagnostic system 36 communicates with ECUs 18 and/or parts installed in vehicle 31, and keeps track of the serial numbers or IDs thereof. The list of serial numbers or IDs can also be obtained by communicating with data processor 32. Whenever a new ECU 18 or part is installed, the list of serial numbers is updated accordingly. The replacement of a new part installed in vehicle 31 indicates that a maintenance process has occurred or completed on vehicle 31. Based on the receipt of the information related to the new part, diagnostic system 36 determines that a maintenance process has occurred.

In response to the determination that a maintenance process has been performed on vehicle 31, diagnostic system 36 performs a process to solicit input from a technician regarding the tasks performed on vehicle 31. The process is similar to those described related to FIGS. 1 and 2.

Diagnostic system 36 then initiates a data transmission process to send the data collected from the technician, the error codes cleared and/or any data relating to the vehicle problem and the maintenance process, to a remote data depository for further processing or data mining. The transmission of the data is performed in various manners, such as via the communication device 38 of diagnostic system 36, via a scan tool connected to data port 15, or via any other communication devices coupled to vehicle 31, such as an onvehicle wireless phone. In one embodiment, diagnostic system 36 stores the collected data in a storage device for later access.

After the data is transmitted to the data depository, the data can be used for data mining and/or any further analyses and uses. Detailed process related to data mining and further processing of the transmitted data are described in U.S. patent application No. 10/613,230, titled DISTRIBUTED EXPERT DIAGNOSTIC SERVICE AND SYSTEM, filed on Jul. 7, 2003 and commonly assigned to the assignee of this application, the disclosure of which is incorporated herein by reference in its entirety.

In the previous descriptions, numerous specific details are set forth, such as specific materials, structures, processes, etc., in order to provide a thorough understanding of the present disclosure. However, as one having ordinary skill in the art would recognize, the present disclosure can be practiced without resorting to the details specifically set forth. In other instances, well known processing structures have not been described in detail in order not to unnecessarily obscure the present disclosure. It is to be understood that the disclosure is capable of use in various other combinations and environments and is capable of changes or modifications within the scope of the inventive concept as expressed herein.

What is claimed is:

1. A vehicle diagnostic method for using a vehicle diagnostic device, external to a vehicle, for performing a maintenance process on the vehicle, the method including the steps of:

determining, by a data processor of the vehicle diagnostic device, an existence of an event representing a performance or completion of a maintenance process performed on a vehicle; and responsive to the existence of the event:

automatically initiating, by the data processor, a data collection process to collect data related to the maintenance process; and initiating, by the data processor, a data transmission process to transmit, by a transmitter of the vehicle diagnostic device, the collected data related to the maintenance process to a remote data processing system via a data network.

2. The method of claim 1 further comprising the step of soliciting input of the data related to the maintenance process from a user.

3. The method of claim 2, wherein:

the maintenance process is performed in connection with a specific symptom; and the collected data includes at least one of an effective fix of the symptom and a description of the symptom.

4. The method of claim 2, wherein the soliciting step includes displaying, by a display of the vehicle diagnostic device, a message requesting an input of the data related to the maintenance process.

5. The method of claim 1, wherein the existence of the performance or completion of the maintenance process is determined based on the existence of a command to clear an error code, a change of a serial number associated with a controller on the vehicle, or a removal of an error code from an error code record.

6. A vehicle diagnostic device, external to a vehicle, for performing a maintenance process on the vehicle, the device comprising:

a data processing unit configured to process data; and a storage device storing instructions that, upon execution by the data processing unit, control the diagnostic device to perform the steps of:

determining an existence of an event representing a performance or completion of the maintenance process; and responsive to the existence of the event:

automatically initiating a data collection process to collect data related to the maintenance process; and initiating a data transmission process to transmit the collected data related to the maintenance process to a remote data processing system coupled to the diagnostic device via a data network.

7. The device of claim 6, wherein the instructions, upon execution by the data processing unit, control the diagnostic device to solicit input of the data related to the maintenance process from a user.

8. The device of claim 7, wherein:

the maintenance process is performed in connection with a specific symptom; and the collected data includes at least one of an effective fix of the symptom and a description of the symptom.

9. The device of claim 7 further including a screen configured to display a message requesting an input of the data related to the maintenance process.

10. The device of claim 6, wherein the existence of the event representing a performance or completion of the maintenance process is determined based on the existence of a command to clear an error code, a change of a serial number associated with a controller on the vehicle, or a removal of an error code from an error code record.

11. The device of claim 6, wherein the device is non-integral to the vehicle and configured to couple to a data port of the vehicle to communicate with an on-board computer of the vehicle.

12. The device of claim 11, wherein the data port is an OBD II interface.

13. The device of claim 6 further including a connector for coupling to a data bus of an on-board diagnostic system of the vehicle.

14. The device of claim 6, wherein the data is transmitted in a wireless manner.

15. A vehicle diagnostic device, external to a vehicle, for performing a maintenance process on the vehicle, the device comprising:

data processing means for processing data; and storage means for storing instructions that, upon execution by the data processing means, controls the diagnostic device to perform the steps of:

determining an existence of an event representing a performance or completion of maintenance process; and responsive to the existence of the event:

automatically initiating a data collection process to collect data related to the maintenance process; and initiating a data transmission process to transmit the collected data related to the maintenance process to a remote data processing system coupled to the diagnostic device via a data network.

* * * * *